(12) United States Patent
Larson et al.

(10) Patent No.: US 7,061,731 B2
(45) Date of Patent: Jun. 13, 2006

(54) HIGH MAGNETIC ANISOTROPY HARD MAGNETIC BIAS ELEMENT

(75) Inventors: David J. Larson, Northfield, MN (US); Eric W. Singleton, Maple Plain, MN (US); Declan Macken, Prior Lake, MN (US); Patrick J. Moran, Bloomington, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 235 days.

(21) Appl. No.: 10/715,149

(22) Filed: Nov. 17, 2003

(65) Prior Publication Data

US 2005/0105223 A1     May 19, 2005

(51) Int. Cl.
    *G11B 5/127* (2006.01)
(52) U.S. Cl. ............................ 360/324.12
(58) Field of Classification Search .......... None
    See application file for complete search history.

(56) References Cited

U.S. PATENT DOCUMENTS

| | | | | |
|---|---|---|---|---|
| 4,880,457 A | * | 11/1989 | Parry et al. | 504/272 |
| 4,994,320 A | * | 2/1991 | Jagielinski | 428/336 |
| 5,214,840 A | * | 6/1993 | Imagawa et al. | 29/603.08 |
| 5,618,738 A | * | 4/1997 | Ao et al. | 438/3 |
| 6,724,581 B1 | * | 4/2004 | Westwood | 360/317 |
| 2002/0126425 A1 | * | 9/2002 | Balamane et al. | 360/324.12 |
| 2002/0181165 A1 | * | 12/2002 | Gill | 360/321 |

OTHER PUBLICATIONS

M. J. Hadley and R. J. Pollard, Magnetic and structural properties of Co films deposited onto obliquely sputtered Pt underlayers, Dec. 15, 2002, pp. 7389-7391.

L.T. Nguyen, A. Lisfi, J.C. Lodder, The effects of metallic underlayers on magnetic properties of obliquely sputtered Co thin films, 2002, pp. 374-377.

A. Lisfi, J.C. Lodder, Microstructural and magnetic properties of metallic thin films obliquely sputtered on polymer, 2002, pp. 370-373.

Y. Ueda, W. Takakura, A. Yamada, Electrical resistivity and magnetism of Fe/Si multilayers prepared by oblique incidence evaporation, 2002, pp. 45-47.

A.J. Shapiro, V.S. Gornakov, V.I. Nikitenko, R.D. McMichael, W.F. Egelhoff, Y.W. Tahk, R.D. Shull, Li Gan, Features of domain nucleation and growth in Co/Ru/Co synthetic antiferromagnets deposited on obliquely sputtered Ta underlayers, 2002, pp. 70-72.

(Continued)

*Primary Examiner*—Allen Cao
(74) *Attorney, Agent, or Firm*—Kinney & Lange, P.A.

(57) ABSTRACT

A magnetoresistive sensor having an MR stack biased by high anisotropy hard bias elements thereby reducing distortion in sensor operation and improving head to head operational values. The high anisotropy hard bias elements are formed from a hard magnetic material deposited in a thin film having a substantially axial preferred direction of magnetic anisotropy prior to application of a setting field. The magnetic anisotropy in the hard magnetic material is formed by oblique deposition in a direction approximately normal to the preferred direction of anisotropy in the resulting hard bias element.

18 Claims, 11 Drawing Sheets

OTHER PUBLICATIONS

M. Cartier, S. Auffret, P. Bayle-Guillemaud, F. Ernult, F. Fettar, and B. Dieny, Influence of deposition angle on the properties of NiO spin-valves, Feb. 1, 2002, pp. 1436-1443.

Jongill Hong, *Member, IEEE*, and Shan X. Wang, *Member, IEEE* Microstructures of FeTaN Films in the Neck Region of Magnetic Recording Heads, Jul. 2001, pp. 3039-3042.

T.J. Klemmer, K.A. Ellis, L. H. Chen, B. van Dover, and S. Jin, Ultrahigh frequency permeability of sputtered Fe-Co-B thin films, Jan. 15, 2000, pp. 830-833.

R.D. McMichael, C.G. Lee, J.E. Bonevich, P.J. Chen, W. Miller, and W. F. Egelhoff, Jr., Strong anisotropy in thin magnetic films deposited on obliquely sputtered Ta underlayers, Nov. 1, 2000, pp. 5296-5299.

B. Dick and M. J. Brett, T. J. Smy, M. R. Freeman, M. Malac, and R. F. Egerton, Periodic magnetic microstructures by glancing angle deposition, 2000, pp. 1838-1844.

R. D. McMichael, C. G. Lee, J. E. Bonevich, P. J. Chen, W. Miller, and W. F. Egelhoff, Jr., Strong anisotropy in thin magnetic films deposited on obliquely sputtered Ta underlayers, Sep. 15, 2000, pp. 3561-3564.

Shan X. Wang and Jongill Hong, Magnetic and Microstructural Characterization of FeTaN High Saturation Materials for Recording Heads, Mar. 2, 1999, pp. 782-787.

M.D. Bijker, E.M. Visser, J.C. Lodder, Th.J.A. Popma, Optimisation of obliquely sputter deposited media, 1999, pp. 352-356.

M. Michijima, H. Hayashi, M. Kyoho, T. Nakabayashi, T. Komoda, T. Kira, T. Kira, Oblique-Incidence Anisotropy in Very Thin Ni-Fe Films, 1999, pp. 3442-3444.

K. Itoh, K. Okamoto, T. Hashimoto, Crystallographic contribution to the formation of the columnar grain structure in cobalt films deposited at oblique incidence, 1998, pp. 176-182.

M. D. Bijker, E. M. Visser and J. C. Lodder, Oblique metal deposited thin films for magnetic recording, 1999, pp. 553-560.

D. Clemens, A. Vananti, C. Terrier, P. Boni, B. Schnyder, S. Tixier, M. Horisberger, Magnetic in-plane anisotropy in sputtered FeCo films and multilayers, 1997, pp. 500-501.

Yung-Chieh Hsieh and Sergie Gadetsky, Takao Suzuki, M. Mansuripur, Oblique sputtering of amorphous TbFeCo thin films on glass substrates and the effect of deposition angle on perpendicular magnetic anisotropy, Apr. 15, 1997, pp. 3555-3560.

J.M. Alameda, F. Carmona, F.H. Salas, L.M. Alvarez-Prado, R. Morales, G.T. Perez, Effects of the initial stages of film growth on the magnetic anisotropy of obliquely-deposited cobalt thin films, 1995, pp. 249-253.

K. Hara, K. Itoh, K. Okamoto, T. Hashimoto, Crystallographic contribution to the formation of the columnar grain structure in cobalt films, 1996, pp. 177-182.

H. Ono, M. Ishida, M. Fujinaga, H. Shishido, and H. Inaba, Texture, microstructure, and magnetic properties of Fe-Co alloy films formed by sputtering at an oblique angle of incidence, 1993, pp. 5124-5128.

Y. F. Zheng and J. P. Wang and V. Ng; Control of the tilted orientation of C.CrPt/Ti thin film media by collimated sputtering; Journal of Applied Physics vol. 91, No. 10; May 15, 2002; pp. 8007-8009.

* cited by examiner

HIGH MAGNETIC ANISOTROPY HARD MAGNETIC BIAS ELEMENT

BACKGROUND OF THE INVENTION

The present invention relates generally to the field of storage and retrieval of data within magnetic media. In particular, the present invention relates to high magnetic anisotropy in hard magnetic bias elements of magnetoresistive sensing elements.

A transducing head of a magnetic data storage and retrieval system typically includes a magnetoresistive (MR) reader portion for retrieving magnetic data stored on a magnetic media. The reader is formed of multiple layers which include an MR sensor generally positioned between two insulating layers, which are in turn positioned between two shield layers. The MR sensor may be any one of a plurality of MR-type sensors, including, but not limited to, anisotropic magnetoresistive (AMR), giant magnetoresistive (GMR), tunneling giant magnetoresistive (TMR), spin-valve, and spin-tunnel sensors.

When the transducing head is placed near a magnetic medium, resistance of the MR sensor changes in response to a magnetic field emanating from written transitions in the magnetic medium. By providing a sense current through the MR sensor, resistance of the sensor can be measured and used by external circuitry to decipher the information stored on the magnetic medium.

To operate the MR sensor properly, the sensor must be stabilized against the formation of edge domains because domain wall motion results in electrical noise that makes data recovery difficult. A common way to stabilize the sensor element as a single domain is by applying a magnetic bias in a desired direction. Thin films of hard magnetic materials have been used in various types of sensing elements including AMR, GMR, TMR, etc., to bias the magnetic field sensing layer. One common design is a "permanent magnet abutted junction" where permanent magnet (PM) bias elements directly abut opposite sides of the sensor element. The permanent magnets have a high coercive field and remanent magnetization oriented in a desired direction, for example parallel to the air bearing surface (ABS) of the sensor element.

During fabrication of the sensor element, the permanent bias elements are formed by depositing hard magnetic materials in a thin film formed of multiple crystalline grains. The magnetic properties of the hard magnetic thin film are influenced by the formation of magnetic domains, which may be referred to as magnetic grains. Each magnetic domain includes one or more crystalline grains having a magnetic moment. The magnetic moments lie generally in the plane of the film. However, within the film plane the magnetic moments are randomly distributed. The result is a hard magnetic thin film with no net in-plane anisotropy.

To properly function as a biasing element, the hard magnetic material must have its remanent magnetization orientated. The magnet is "set" by orienting the magnetic moment of each magnetic domain by applying a large magnetic field in the desired direction, for example parallel to the air bearing surface (ABS). Ideally the application of this field leads to an alignment of the magnetic moment of each individual grain such that all the moments are oriented parallel. Due to the random orientation of each grain's magnetic moment in the unset film, some grains resist the setting field more than others and can produce less than perfect alignment of the magnetic moments within the hard magnetic thin film.

The size of sensor elements in transducing heads is shrinking in response to the increasing areal density of magnetic media. The result of decreasing sensor element size is fewer "magnetic grains per sensor" in the hard bias elements. The sensor element dimension perpendicular to the ABS, commonly known as the stripe height, is currently approaching 100 nanometers or less and is likely to continue to diminish. Dimensions of that magnitude can lead to a few as 1 to 3 magnetic grains of hard magnetic material per junction in the stripe height direction. Thus when a small sensor has even one misoriented magnetic grain, a larger number of magnetic grains per sensor are oriented in an errant direction.

Imperfect alignment within the hard magnetic thin film of the biasing elements can lead to a degradation of sensor properties, including head-to-head comparisons of amplitude, noise and glitching. Because recording heads are fabricated en masse on a single wafer it is desired that any variation in operation between heads is minimized or ideally is zero. However, distortion caused by misalignment of single grains within the hard magnetic bias elements increases head-to-head variation. The result is reduced manufacturing yield, increased production cost and potentially increased field failure rates. Consequently, there remains a need in the art for improved magnetic anisotropy in permanent magnet bias elements thereby reducing distortion in sensor properties.

BRIEF SUMMARY OF THE INVENTION

A magnetoresistive sensor with an MR stack biased by high anisotropy hard bias elements has reduced distortion in sensor operation from misaligned magnetic moments. The high anisotropy hard bias elements are formed from a hard magnetic material deposited in a thin film having a plurality of magnetic grains. Each magnetic grain has a substantially axial preferred direction of magnetic anisotropy even without application of a setting field. The axis is determined by the deposition method and optional seedlayer(s). The magnetic anisotropy is directed in the hard magnetic material by oblique deposition in a direction approximately normal to the preferred direction of anisotropy in the resulting hard bias element. The magnetization of the hard magnetic material is unidirectionally aligned along the preferred anisotropy axis by application of a unidirectional setting field.

DETAILED DESCRIPTION

Figure 1:
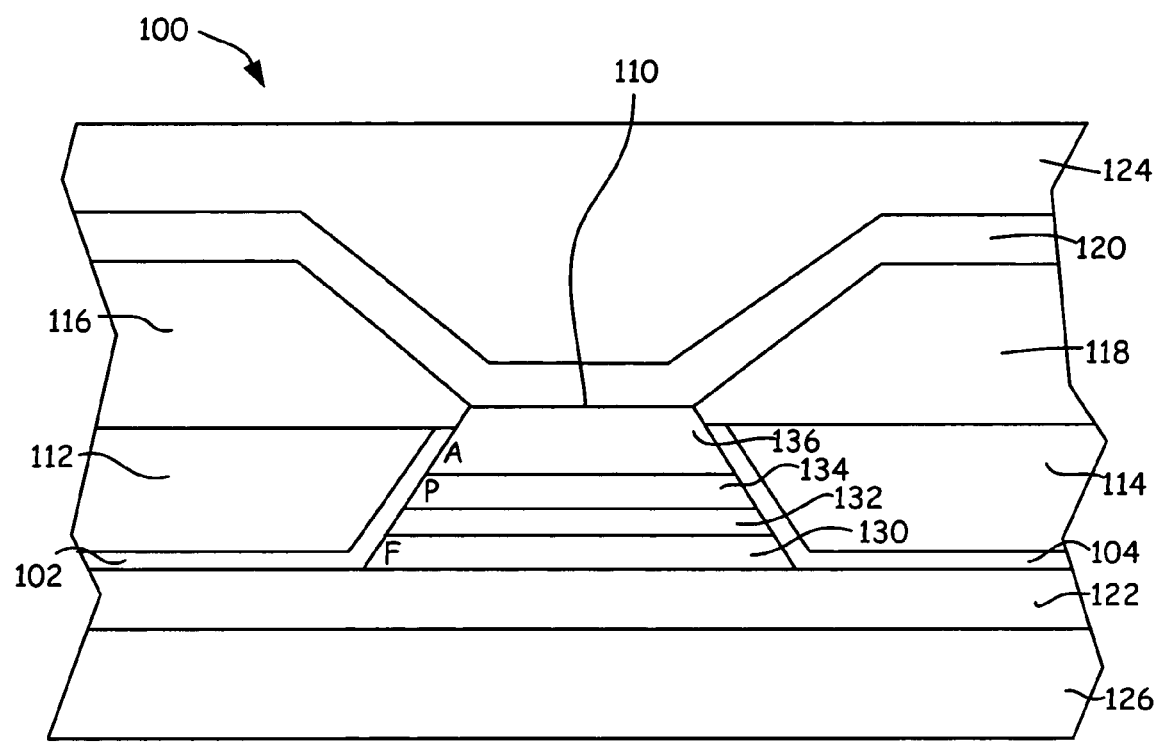
FIG. 1 is a cross-sectional view of a first example current-in-plane transducing head in accord with the present invention.

FIG. 1 is a cross-sectional view of a first example transducing head 100 with high anisotropy bias elements in accord with the present invention. Transducing head 100 is a current-in-plane (CIP) type head which includes first and second permanent magnet (PM) seed layers 102 and 104, magnetoresistive (MR) sensor 110, first and second high anisotropy permanent magnet (PM) bias elements 112 and 114, first and second contacts 116 and 118, top and bottom insulating layers 120 and 122, and top and bottom shields 124 and 126.

MR sensor 110 is a multilayer device operable to sense magnetic flux from a magnetic media. MR sensor 110 may be any one of a plurality of MR-type sensors, including, but not limited to, AMR, GMR, TMR, spin-valve and spin-tunnel sensors. At least one layer of MR sensor 110 is a sensing layer that requires longitudinal biasing, such as a free layer of a GMR spin-valve sensor. Moreover, for several types of MR sensors, at least one layer of MR sensor 110 is an antiferromagnetic layer that requires annealing to set a magnetization direction therein.

For illustrative purposes only, MR sensor 110 of FIG. 1 is shown as a top spin-valve having sensing layer 130, spacer layer 132, pinned layer 134, and antiferromagnetic layer 136. Spacer layer 132 is positioned between sensing layer 130 and pinned layer 134, and pinned layer 134 is positioned between antiferromagnetic layer 136 and spacer layer 132. Sensing layer 130 and pinned layer 134 are each formed of at least one layer of a ferromagnetic material, while spacer layer 132 is formed of a nonmagnetic material. The magnetization of sensing layer 130 rotates freely in response to external magnetic field emanating from a magnetic medium, while the magnetization of pinned layer 134 is fixed in a predetermined direction by exchange coupling with antiferromagnetic layer 136. The resistance of MR sensor 110 varies as a function of an angle that is formed between the magnetization of sensing layer 130 and the magnetization of pinned layer 134.

First and second high anisotropy PM seed layers 102 and 104 are deposited upon portions of bottom gap 122 not covered by MR sensor 110 and on opposite sides of MR sensor 110. PM seed layers 102 and 104 function to magnetically decouple high anisotropy PM bias elements 112 and 114 from MR sensor 110. PM seed layers 102 and 104 help to promote a desired texture and to enhance grain growth of subsequently deposited layers, for example PM bias elements 112 and 114.

First and second high anisotropy permanent magnet (PM) bias elements 112 and 114 abut opposite sides of MR sensor 110 to provide longitudinal biasing to the sensing layer of MR sensor 110. In transducing head 100, high anisotropy PM bias elements 112 and 114 are each magnetostatically coupled to MR sensor 110. The magnetic field from high anisotropy PM bias elements 112 and 114 stabilizes, prevents edge domain formation, and provides proper bias for the sensing layer of MR sensor 110. The high anisotropy PM bias elements are further described after the remaining structure of transducing head 100.

First and second contacts 116 and 118 are formed respectively on high anisotropy PM bias elements 112 and 114. Contacts 116 and 118 abut opposite sides of MR sensor 110. Contacts 116 and 118 provide a sense current to MR sensor 110 in a direction substantially parallel to a plane of the layers of MR sensor 110. As is generally known in the industry, the sense current is passed through MR sensor 110 to detect changes in the resistivity of MR sensor 110, which is indicative of the data stored on the magnetic medium being read. Contacts 116 and 118 are typically formed of conductive materials, such as, but not limited to, tantalum, rhodium, titanium, tungsten, chromium, copper, gold silver or alloys of these materials.

Top insulating layer 120 is formed adjacent MR sensor 110 and adjacent contacts 116 and 118. Bottom insulating layer 122 is formed adjacent MR sensor 110 and adjacent PM bias seeds 102 and 104. PM bias elements 112 and 114 are formed on PM bias seeds 102 and 104. Insulating layers 120 and 122 abut opposite sides of MR sensor 110. Insulating layers 120 and 122 function to magnetically decouple MR sensor 110 from shields 124 and 126. Insulating layers 120 and 122 are formed of a nonmagnetic, electrically insulating material.

Top shield 124 is formed on insulating layer 120 opposite MR sensor 110 and contacts 116 and 118. Bottom shield 126 is formed adjacent insulating layer 122 opposite MR sensor 110 and high anisotropy PM bias elements 112 and 114. Shields 124 and 126 are formed on opposite sides of MR sensor 110. MR sensor 110 reads only that information stored directly beneath it on a specific track of the magnetic medium because shields 124 and 126 function to absorb any stray magnetic fields emanating from adjacent tracks and transitions.

High Anisotropy PM Bias Elements

Transducing head 100 improves sensor operation by incorporating high anisotropy PM bias elements. Although described in the context of transducing head 100, high anisotropy PM bias elements are applicable to a variety of sensor designs incorporating hard magnetic materials to provide sensor bias. Additional representative examples of various sensors are provided below; however the application of high anisotropy permanent magnetic bias is not limited to the examples demonstrated herein.

Figure 2:
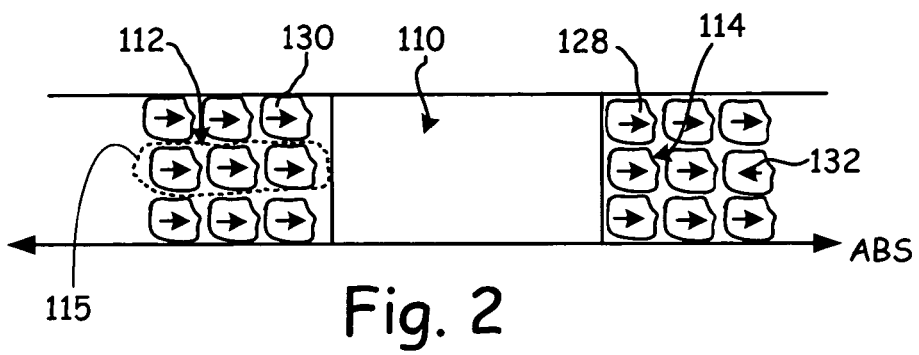
FIG. 2 is a plan view of a high anisotropy PM bias element prior to setting field application.

High anisotropy PM bias elements 112 and 114 of transducing head 100, additionally shown in the plan view of FIG. 2, are generally formed of a high coercivity (hard) magnetic material, such as CoCr, CoCrPt, CoCrTa, CoCrTaPt, CoPt, or CoNiCr. FePt alloys are also suitable, for example, FePt alloys described in U.S. patent application: Ser. No. 10/464,343, Magnetoresistive Transducer with Low Magnetic Moment, High Coercivity Stabilizing Magnets filed on Jun. 24, 2003.

The hard magnetic materials are deposited in a manner to direct a preferred magnetic anisotropy in the thin film. Thin films of hard magnetic materials in high anisotropy PM bias elements are composed of a plurality of individual grains 128. The grains are organized into elongated domains, one of which is represented by dashed line 115. The domains are elongated in a direction parallel to the preferred magnetic orientation of the high anisotropy PM bias elements 112, 114 and MR sensor 110. Each grain has a magnetic moment directed along a magnetic easy axis (preferred magnetic anisotropy). The easy axes of the domains are substantially parallel to each other and parallel to the preferred orientation, for example parallel to the ABS prior to applying a setting field. The magnetic moments of the grains combine to give a net magnetic moment along an easy axis for the domain.

The plan view of FIG. 2 shows the magnetic moments of MR sensor 110 and PM bias elements 112 and 114 as deposited with no setting field applied. Arrows 130 illustrate the magnetic moments of each grain/magnetic domain 128, which is directed parallel to the ABS. In addition, the magnetic moments of the domains predominately share a common orientation with some proportion of the grains being misoriented, such as grain 132. However, in the present invention, grains that are misoriented are not randomly oriented. Misoriented grains are still directed along the magnetic easy axis, for example parallel with the ABS, but are rotated 180° (facing the opposite direction) from the preferred orientation. Orientation of the magnetic moment within each grain upon deposition is basically limited to two orientations along a single desired axis, with the majority of the moments in the preferred orientation. The result is high anisotropy in the PM bias elements thereby improving sensor performance and improving the equivalency of operation from head to head.

Figure 3:
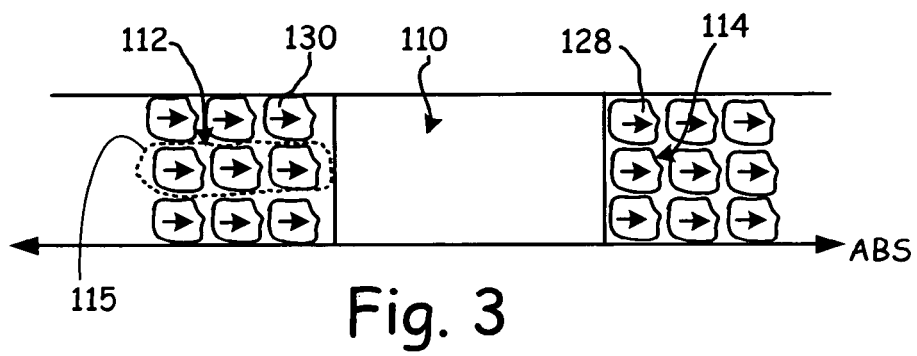
FIG. 3 is a plan view of a high anisotropy PM bias element after setting field application.

The high anisotropy PM bias elements 112 and 114 are preferably "set" during head fabrication by the application of a large magnetic field along a direction parallel to the air bearing surface (ABS). The setting field corrects the misdirection of magnetization of any errant grains; leading to a representative hard magnet structure of the present invention such as is seen in FIG. 3. After removal of the setting field, the magnetic easy axis (remanent magnetization) of each grain 128 is aligned substantially parallel with common orientation.

Figure 4:
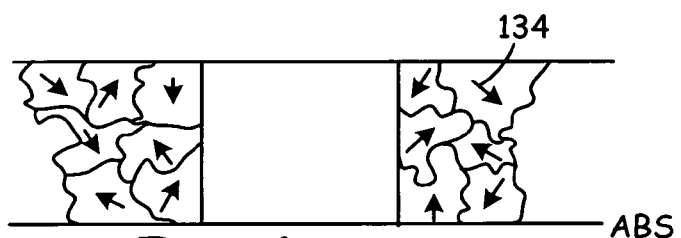
FIG. 4 is a plan view of a conventional PM bias element prior to setting field application for orienting the grains of hard magnetic material.
Figure 5:
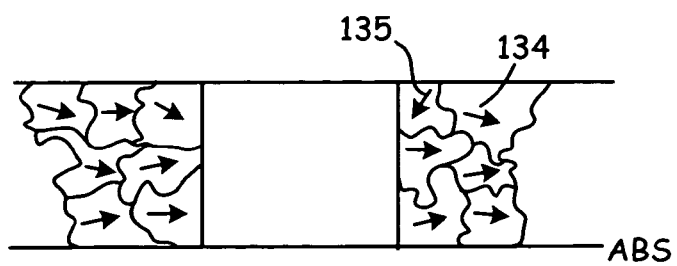
FIG. 5 is a plan view of a high anisotropy PM bias element after applying a setting field.

In contrast to the high anisotropy PM bias elements shown in FIGS. 2 and 3, conventional PM Bias elements, as shown in the plan view of FIG. 4, have randomly oriented magnet moments in the film plane as indicated by arrows 134. As described in the background above, the random distribution of magnetic easy axis orientations of the grains within the film plane of conventional PM bias elements can produce less than perfect alignment of the magnetic moments. As shown in FIG. 5, errant alignment in conventional PM bias elements that remains after setting field application, such as arrow 135, can lead to impairment of sensor function. The problems experienced in the prior art due to MR sensor signal degradation related to imperfect alignment of magnetic domains within PM bias elements are reduced or eliminated by the high anisotropy PM bias elements of the present invention.

Figure 6:
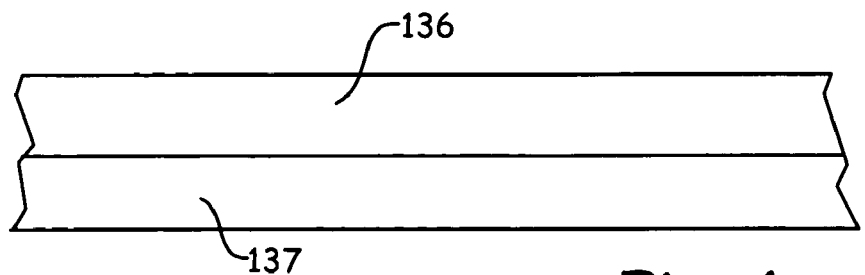
FIGS. 6–9 illustrate initial fabrication steps of a transducing head.
Figure 7:
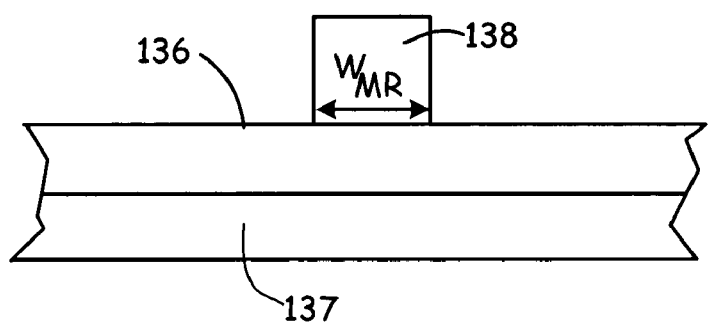
Figure 8:
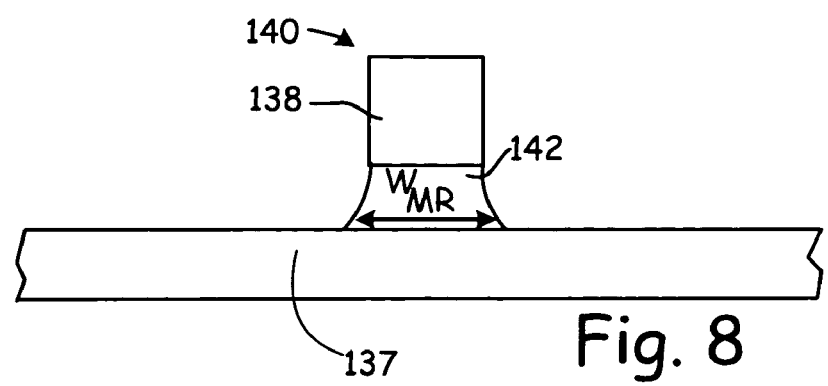

FIGS. 6–14 illustrate a method of forming a transducing head with high anisotropy PM bias elements. FIG. 6 shows a first step, in which a plurality of MR sensor layers 136 is deposited on a substrate 137. FIG. 7 shows a following step in which a portion of MR sensor layers 136 is masked off by photoresist 138, wherein photoresist 138 defines MR sensor width $W_{MR}$. FIG. 8 shows the next step, in which structure 140 is milled, removing portions of MR sensor layers 136 that are not masked off. The result is MR sensor 142 with a MR sensor width $W_{MR}$.

Figure 9:
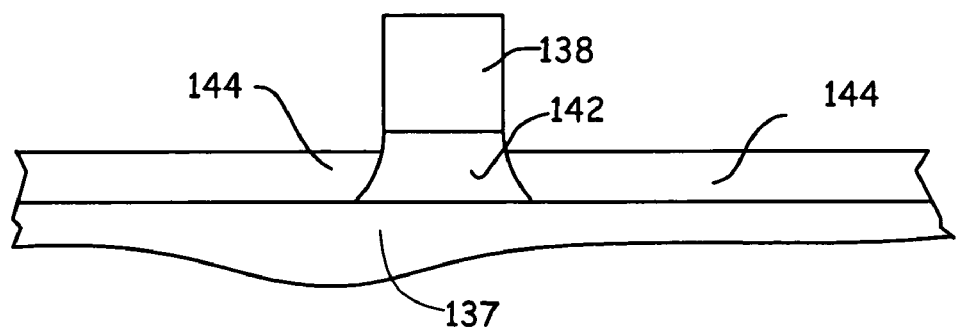

In FIG. 9, material to form high anisotropy PM bias elements 144 is obliquely deposited adjacent to MR sensor 142. Alternatively, seed layers may be deposited prior to PM bias elements 144. The seed layers (not shown) must be compatible with and preferably facilitate growth of organized grains with magnetic anisotropy. Seed layers may be deposited either by normal deposition techniques or oblique deposition at an angle θ similar to that used for high anisotropy bias elements. Oblique deposition onto substrate 137 induces a preferred axis of anisotropy in the hard magnetic film prior to application of the setting field.

Figure 10:
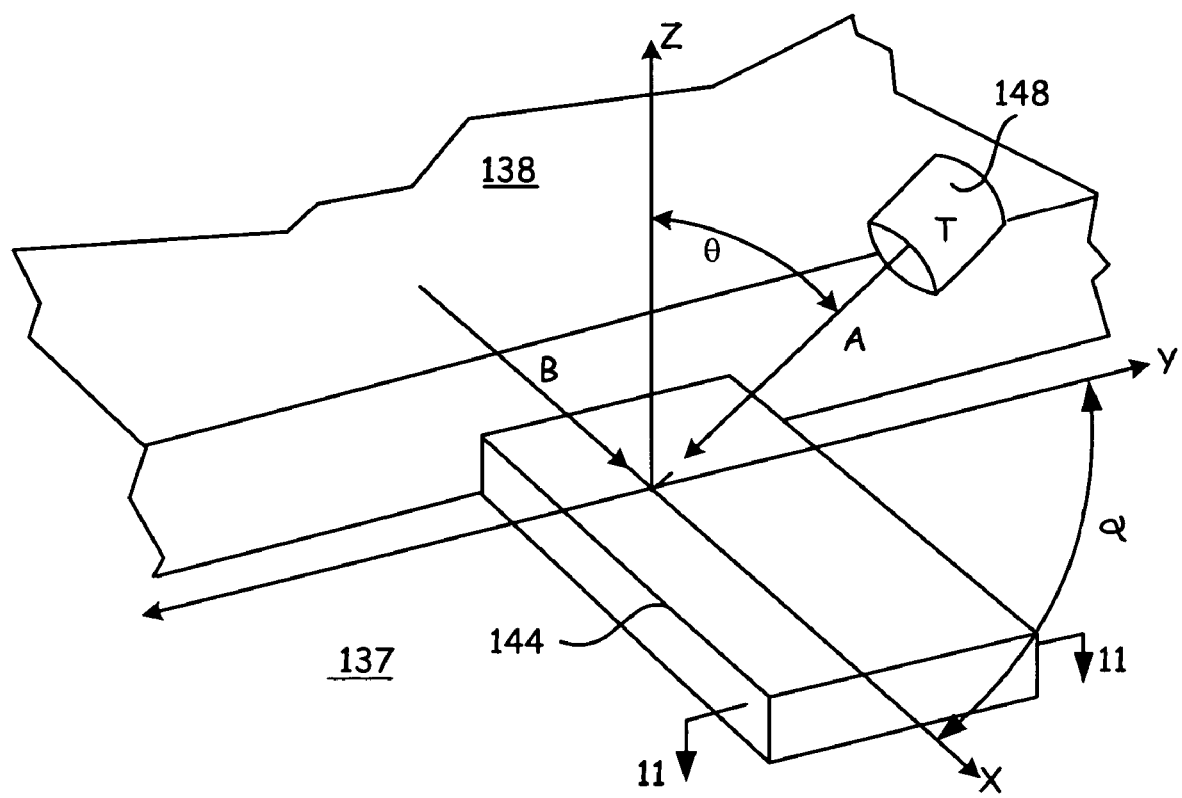
FIG. 10 is a perspective view of oblique deposition of high anisotropy hard bias elements.

Oblique deposition onto substrate 137 to form high anisotropy PM bias elements is shown in FIG. 10. The angle of oblique deposition, θ is measured from a surface normal. A surface normal for substrate 137 is shown in FIG. 10 as the Z axis of the reference Cartesian coordinate axes. The oblique angle of incidence θ measured from a surface normal is preferably approximately 60° up to approximately 90°, more preferably 65° to 75° with approximately 70° being most preferred. During oblique deposition, substrate 137 is preferably non-rotating for deposition from a point source 148. Point source 148 is preferably a physical vapor deposition (PVD) source, such as an ion beam sputter deposition source. Alternatively, a collimating device may be used to limit the incidence angles of deposition flux to the desired range of oblique angles.

Selection of the proper orientation of incidence of the deposition flux which form the magnetic film is required to direct anisotropy of the grains/magnetic domains in a preferred direction, for example along the ABS direction. Therefore, in addition to the oblique angle, the deposition direction as shown by arrow A is preferably normal to the preferred anisotropy direction. In FIG. 10, the preferred anisotropy direction is parallel to the ABS direction (X axis), therefore deposition is directed at angle α, approximately 90° from the X axis. Angle α may be varied or wobbled during deposition by approximately ±10° from normal. Angle α may be varied to compensate for any shadowing that may be caused by photoresist 138, the structure of which may vary according to the transducing head design and fabrication methods used.

Figure 11:
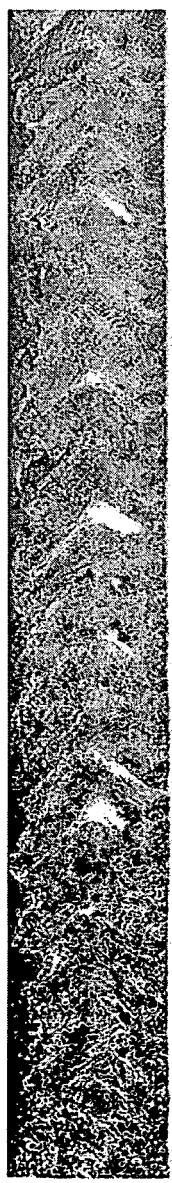
FIG. 11 is a cross-sectional view of a high anisotropy hard bias element taken along line 11—11 of FIG. 10.

Due to the nature of physical deposition techniques, the deposited material 144 tends to be thicker nearer the source 148. To compensate, a first layer of hard bias material is deposited according to position A. A second layer is subsequently deposited at the same angle θ, but from the opposite side, approximately 180° relative to angle α in the X-Y plane as shown by position B in FIG. 10. Deposition is alternated between position A and position B until the hard bias material has reached the desired thickness. A cross-section along line 11—11 of FIG. 10 illustrates the resulting texture of the high anisotropy PM element as shown in FIG. 11.

Figure 13:
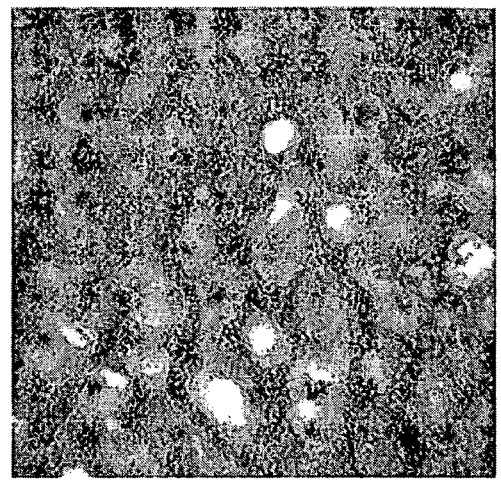
FIG. 13 is a top view transmission electron micrograph of a high anisotropy hard bias element after deposition.
Figure 12:
FIG. 12 is a top view transmission electron micrograph of a conventional hard bias element.

FIGS. 12 and 13 are Transmission Electron Micrographs (TEM) of high anisotropy hard bias elements with an approximate scale of 1.2 μm by 1.2 μm. FIG. 12 is a top view TEM of conventional hard bias elements. FIG. 13 is a top view TEM with reversed contrast of high anisotropy hard bias elements of the present invention. In FIG. 13, the dark areas are voids between grains and magnetic domains. The lighter gray and white areas are crystalline grains organized into elongated magnetic domains.

Figure 14A:
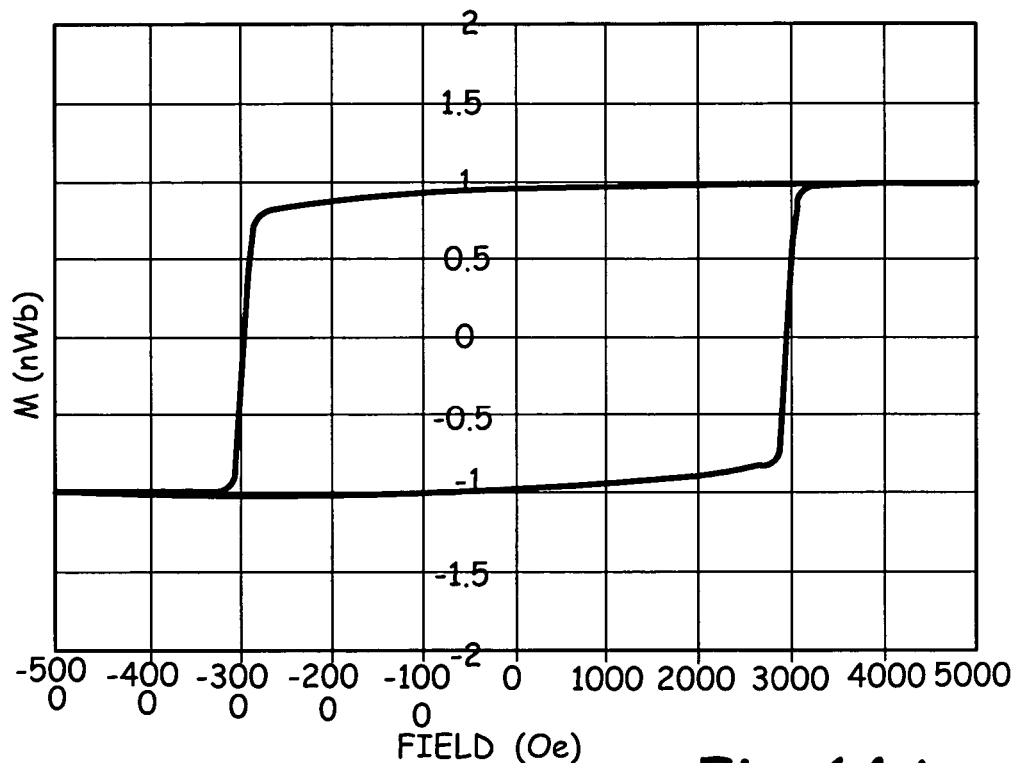
FIG. 14A is a hysteresis loop with a magnetic field applied parallel to the ABS for a high anisotropy hard bias element.
Figure 14B:
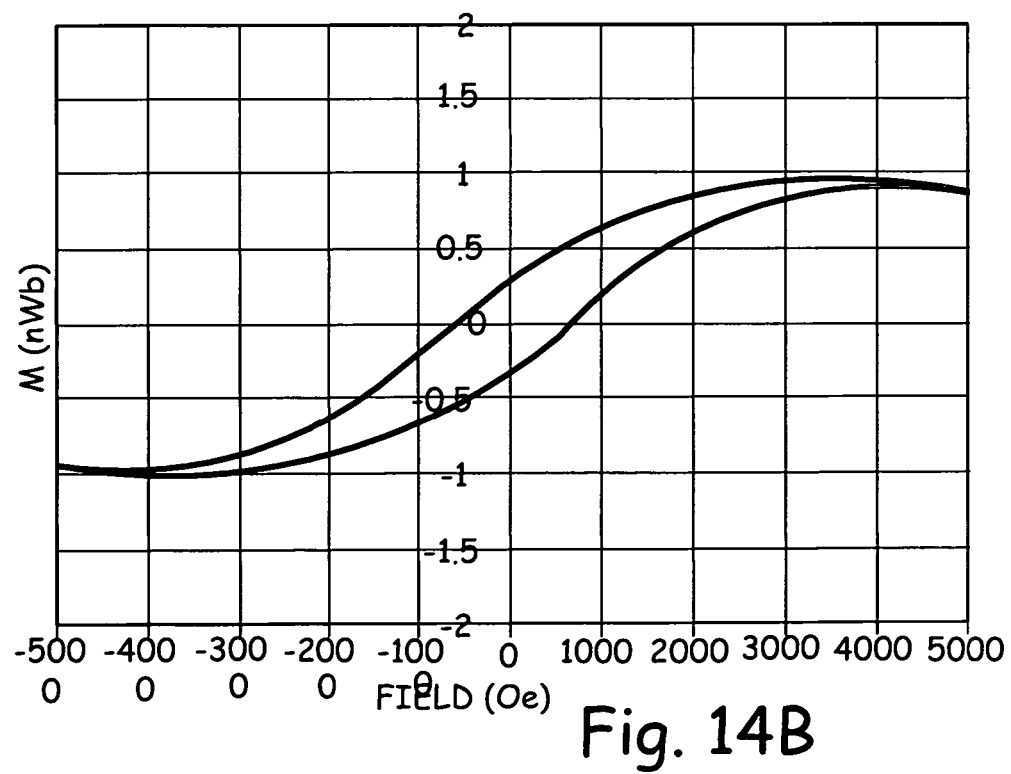
FIG. 14B is a hysteresis loop with a magnetic field applied perpendicular to the ABS for a high anisotropy hard bias element.
Figure 15A:
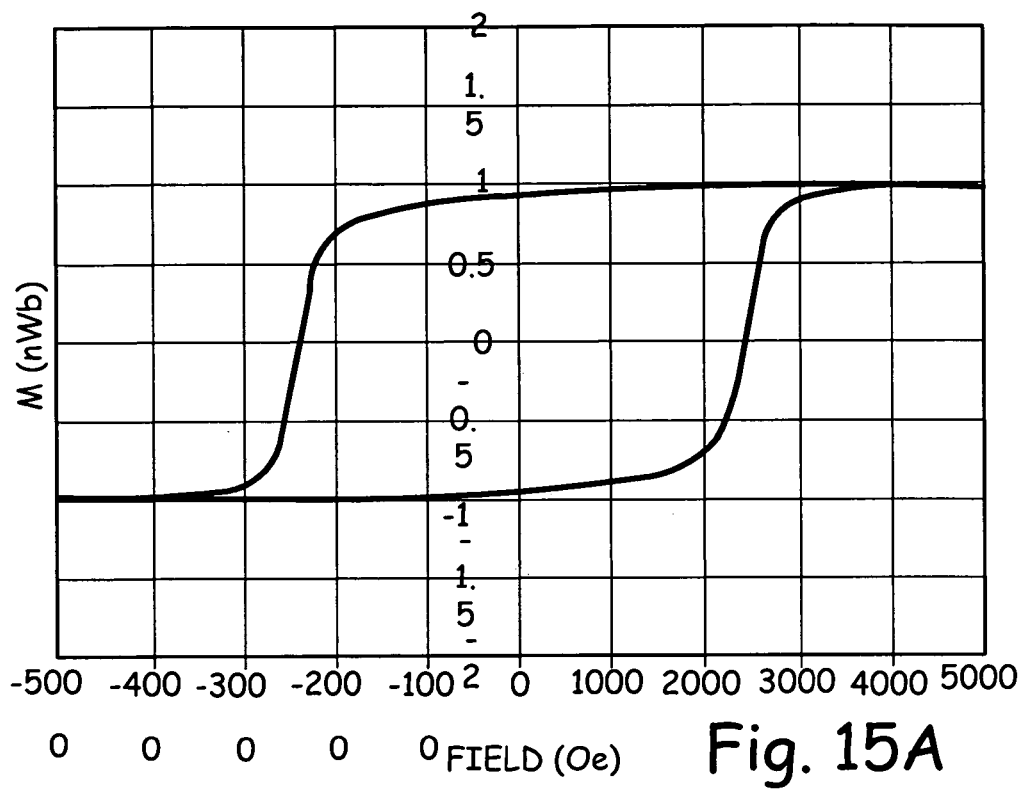
FIG. 15A is a hysteresis loop with a magnetic field applied parallel to the ABS for a conventional hard bias element.
Figure 15B:
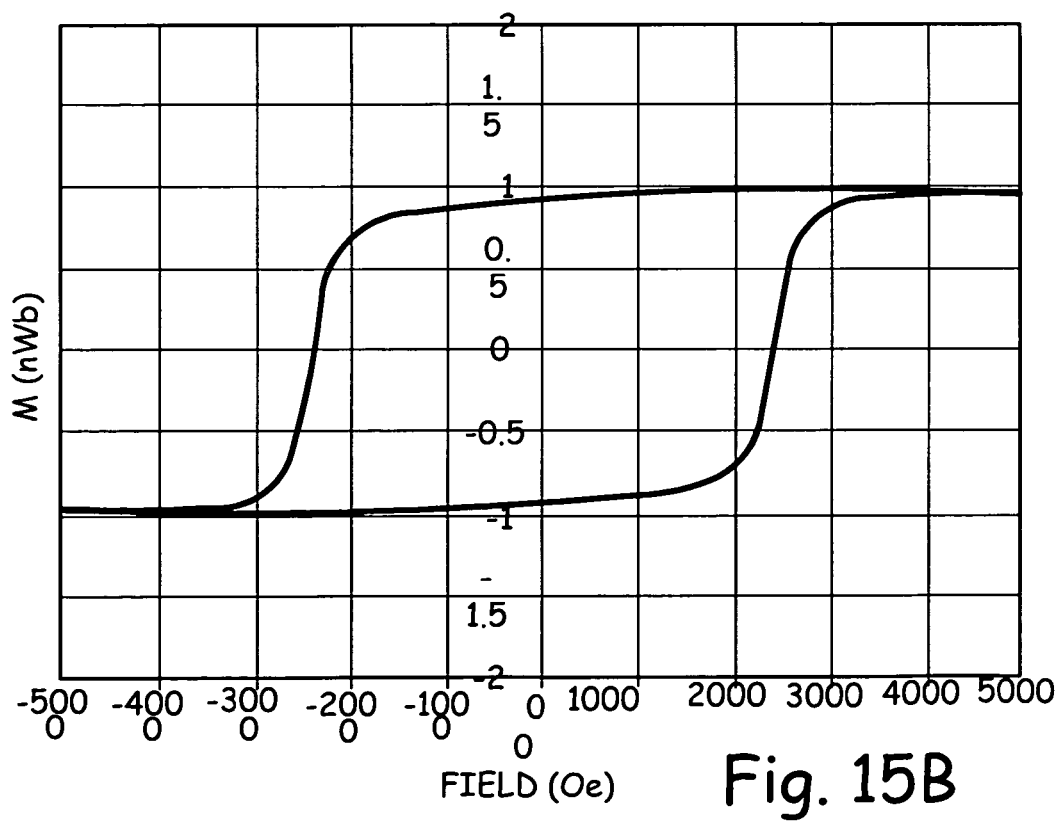
FIG. 15B is a hysteresis loop with a magnetic field applied perpendicular to the ABS for a conventional hard bias element.

Typical magnetic properties of high anisotropy hard bias materials of the present invention are illustrated in FIGS. 14A and 14B. For comparison, the typical magnetic properties of conventional hard biased materials are illustrated in FIGS. 15A and 15B. The hysteresis curves of FIGS. 14A, 14B, 15A and 15B are normalized to a maximum value of 1 for purposes of comparison. The hysteresis curves of FIG. 14A for high anisotropy hard bias and FIG. 15A for conventional hard bias are taken with a magnetic field applied parallel to the ABS, while the hysteresis curves of FIG. 14B for the high anisotropy hard bias and FIG. 15B for conventional hard bias are taken with a magnetic field applied perpendicular to the ABS.

The similarity in shape of the hysteresis curves for the conventional hard bias elements shown in FIGS. 15A and 15B illustrates that the conventional hard bias elements do not posses high anisotropy within the element. Rather the magnetic moments of the individual grains and domains of the conventional materials are oriented randomly within the thin film plane.

In contrast, FIG. 14A illustrates a highly organized, high anisotropy hard bias material due to the squareness of the hysteresis curve taken parallel to the air bearing surface. The desired anisotropic properties of the high anisotropy hard bias materials further illustrated in FIG. 14B where a magnetic field applied perpendicular to the ABS illustrates the easy axis does not lie in this orientation.

Figure 16:
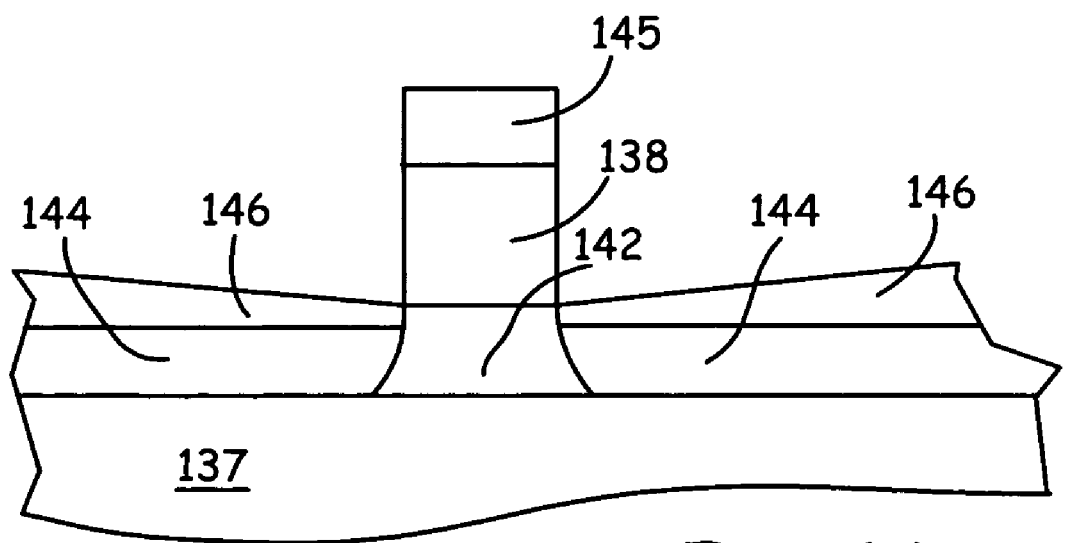
FIGS. 16–17 illustrate fabrication steps to complete a transducing head.
Figure 17:
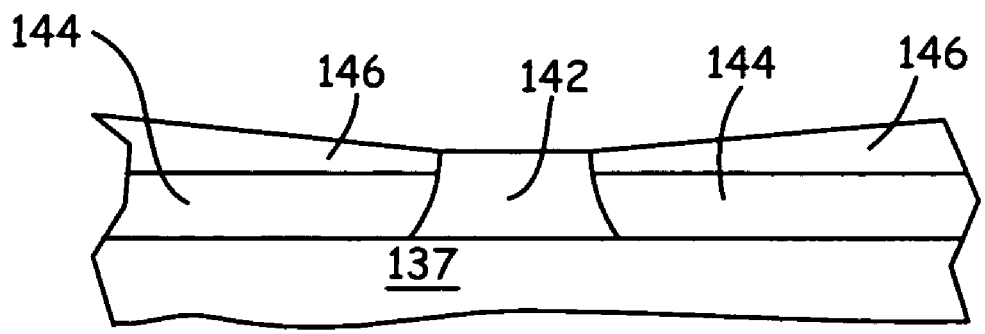

The method for forming a transducing head with high anisotropy PM bias elements continues in FIG. 16. FIG. 16 shows the next step for fabrication, in which contact material 146 is deposited on high anisotropy PM bias element material 144. FIG. 17 shows the structure of FIG. 16 after photoresist 138, along with any excess hard magnetic material and contact material 145 deposited thereon, are removed using conventional techniques.

Additional Examples of Transducing Heads

Figure 18:
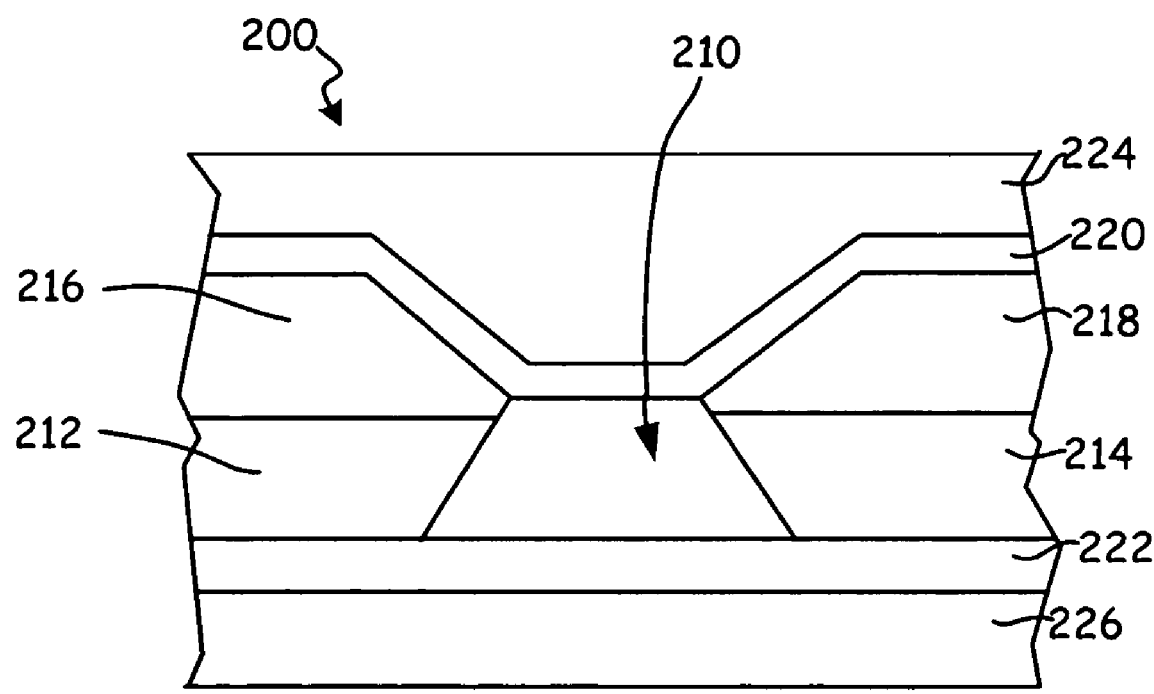
FIG. 18 is a cross-sectional view of a second example current-in-plane transducing head in accord with the present invention.

FIG. 18 is a cross-sectional view of a second example transducing head 200 in accord with the present invention. Transducing head 200 is a CIP-type which includes MR sensor 210, first and second high anisotropy PM bias elements 212 and 214, first and second contacts 216 and 218, top and bottom insulating layers 220 and 222, and top and bottom shields 224 and 226.

Transducing head 200 is similar to transducing head 100 of FIG. 1, with the exception that transducing head 100 includes first and second seed layers 102 and 104. For that reason, elements common to both FIGS. 1 and 18 are like-numbered in the last two digits, for example CIP transducing head 100 and CIP transducing head 200. Moreover, the discussion pertaining to those elements common to both FIGS. 1 and 18 with reference to FIG. 1 applies equally to their inclusion in FIG. 18, and thus, will not be repeated below. In this embodiment, high anisotropy PM bias elements 212 and 214 are each exchange coupled to MR sensor 210.

Figure 19:
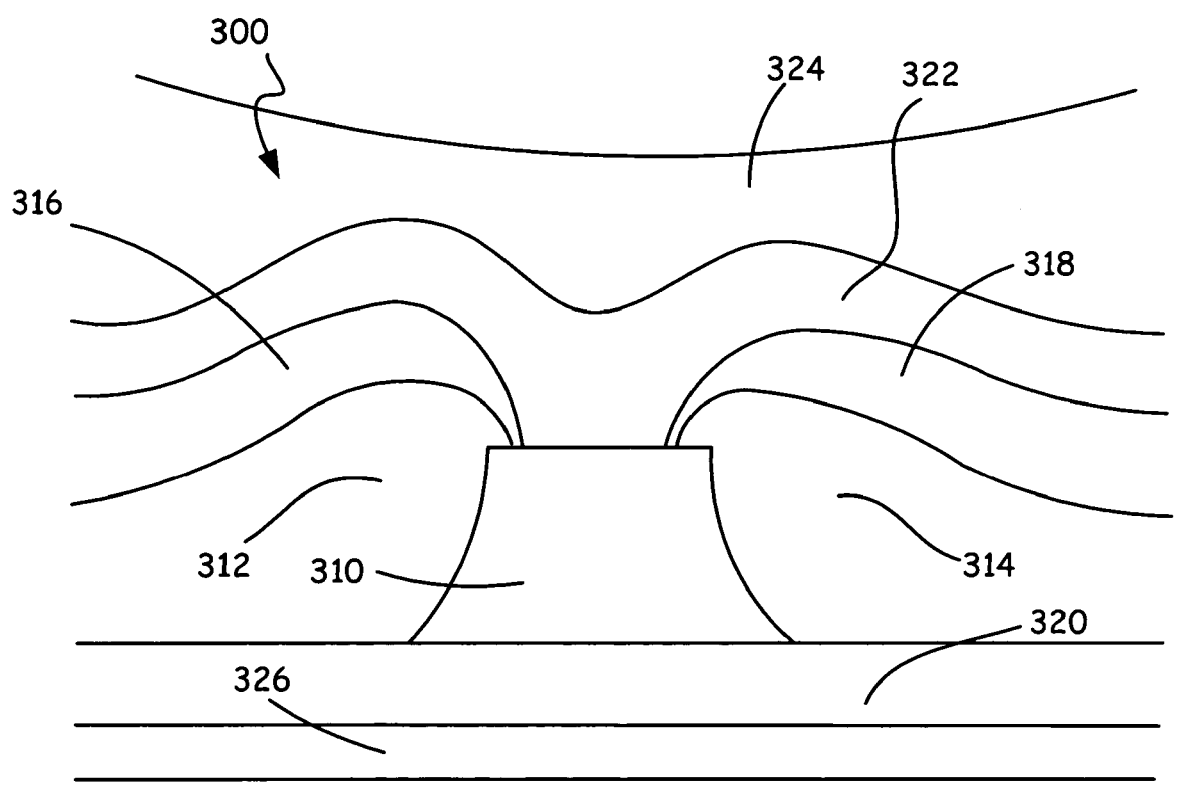
FIG. 19 is a cross-sectional view of a current-perpendicular-to-plane transducing head in accord with the present invention.

FIG. 19 is a cross-sectional view of a third example transducing head 300 in accord with the present invention. Transducing head 300 is a CIP-type which includes MR sensor 310, first and second high anisotropy PM bias elements 312 and 314, first and second contacts 316 and 318, top and bottom insulating layers 320 and 322, and top and bottom shields 324 and 326. Transducing head 300 is similar to transducing head 100 of FIG. 1 and transducing head 200 of FIG. 18, with the exception that transducing head 100 includes first and second seed layers 102 and 104. Common elements are similarly numbered and discussion pertaining to elements of transducing head 100 applies to those elements that are in common with transducing head 300 as well. In this embodiment, high anisotropy PM bias elements 312 and 314 are each exchange coupled to MR sensor 310. Spacers may be included between MR sensor 310 and high anisotropy PM bias elements 312 and 314 such that the coupling is alternatively magnetostatic.

Figure 20:
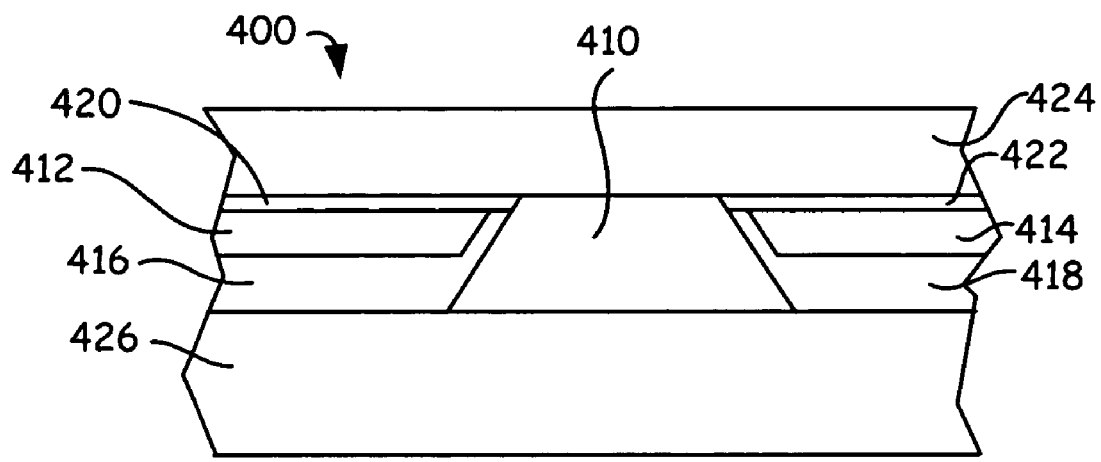
FIG. 20 is a cross-sectional view of a third example current-in-plane transducing head in accord with the present invention.

FIG. 20 is a cross-sectional view of a current-perpendicular-to-plane (CPP) transducing head 400 in accord with the present invention. Transducing head 400 includes MR sensor 410, high anisotropy PM bias elements 412 and 414, insulating layers 416 and 418, optional insulating layers 420, and 422, and top and bottom shields 424 and 426. CPP transducing head 400 differs from CIP transducing heads 100, 200, and 300 in that the sense current provided to TMR sensor 410 is provided in a direction substantially perpendicular to the planes of layers (not shown) of TMR sensor 410, rather than in a direction substantially parallel. MR sensor 110 may be any one of a plurality of MR-type sensors, including, but not limited to, GMR, TMR, spin-valve and sensors.

TMR sensor 410 is a multilayer device operable to sense magnetic flux from a magnetic media. At least one layer of TMR sensor 410 is a sensing layer that requires longitudinal biasing. Moreover, TMR sensor 410 may include an anti-ferromagnetic layer that requires annealing to set a magnetization direction therein.

First and second high anisotropy PM bias elements 412 and 414 are positioned on opposite sides of TMR sensor 410 to provide longitudinal biasing to the sensing layer of TMR sensor 410. High anisotropy PM bias elements 412 and 414 are recessed from TMR sensor 410 a distance in a range of about 20 Angstroms to about 300 Angstroms. Thus, high anisotropy PM bias elements 412 and 414 are magnetostatically coupled with TMR sensor 410. High anisotropy PM bias elements 412 and 414 are otherwise similar to high anisotropy PM bias elements 112 and 114 of FIG. 1.

Insulating layer 416 is positioned between bottom shield 426 and first high anisotropy PM bias element 412, and also between first high anisotropy PM bias element 412 and TMR sensor 410. Similarly, insulating layer 418 is positioned between bottom shield 426 and second high anisotropy PM bias element 414, and is also positioned between second high anisotropy PM bias element 414 and TMR sensor 410. Seed layers (not shown) may optionally be included between insulating layers 416 and 418 and high anisotropy PM bias elements 412 and 414. Optional insulating layers 420 and 422 are positioned on high anisotropy PM bias elements 412 and 414 on opposing sides of TMR sensor 410. Insulating layers 416, 418, 420, and 422 function to magnetically decouple TMR sensor 410 from shields 424 and 426. Insulating layers 416, 418, 420, and 422 also function to minimize the shunting of sense current from TMR sensor 410 to high anisotropy PM bias elements 412 and 414. Each of insulating layers 416, 418, 420, and 422 is formed of nonmagnetic material.

Top shield 424 is formed adjacent to TMR sensor 410 and insulating layers 420 and 422. Bottom shield 426 is formed adjacent to TMR sensor 410 and insulating layers 416 and 418. Shields 424 and 426 are formed on opposite sides of TMR sensor 410. TMR sensor 410 reads only information stored directly beneath it on a specific track of a magnetic medium because shields 424 and 426 function to absorb any stray magnetic fields emanating from adjacent tracks and transitions. In addition, shields 424 and 426 function to provide a sense current to TMR sensor 410 in a direction substantially perpendicular to planes of layers (not shown) of TMR sensor 410. Sense current is passed through TMR sensor 410 to detect changes in the resistivity of TMR sensor 410, which are indicative of the data stored on the magnetic medium being read. Shields 424 and 426 preferably are composed of a soft magnetic material, such as, but not limited to, a NiFe alloy.

Common elements of transducing head 400 and transducing head 100 are similarly numbered. Previous discussion of common elements relative to transducing head 100 is also relevant here with the exception of those differences noted above.

Figure 21:
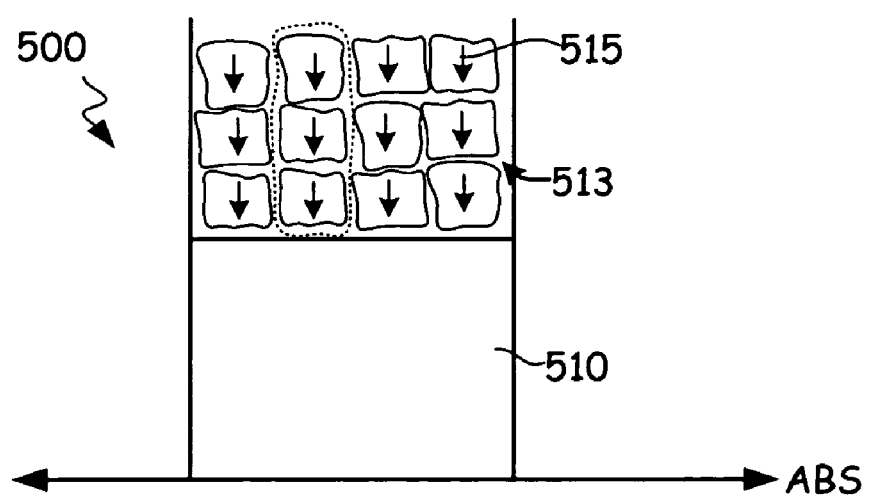
FIG. 21 is a plan view of a current-perpendicular-to-plane multilayer transducing head in accord with the present invention.

FIG. 21 is a plan or top view of a current-perpendicular-to-plane (CPP) transducing head 500 in accord with the present invention. Transducing head 500 is a CPP multilayer type head where a single high anisotropy PM biasing element 513 is placed behind the MR sensor 510. The ABS direction is indicated in FIG. 21 relative to MR sensor 510. Previous discussion of high anisotropy bias elements, particularly those relative to transducing head 100 and transducing head 400 also apply to high anisotropy PM bias element 513. The preferred orientation of the magnetic moments in high anisotropy bias element 513 is depicted by arrows 515. The magnetic anisotropy of high anisotropy bias element is plane 513 and directed perpendicular to the ABS direction. Transducing head 500 demonstrates the ability to select the orientation of the high anisotropy PM bias elements such that a variety of transducing heads may utilize the inventive bias.

In summary, transducing heads comprising high anisotropy PM bias elements reduce sensor signal degradation and improve head to head values through improved anisotropy. Improved anisotropy of high anisotropy PM bias elements is created by oblique deposition directed normal to the desired anisotropy of the hard magnetic material. High anisotropy PM bias elements are not limited to transducing heads with traditional longitudinal biasing schemes and may replace conventional hard bias materials in any transducing head. The present invention is a solution for the increasing problem of distortion from misaligned grains as the stripe height of magnetoresistive sensors continues to decrease with demand for increasing areal density of magnetic media.

Although the present invention has been described with reference to preferred embodiments, workers skilled in the art will recognize that changes may be made in form and detail without departing from the spirit and scope of the invention.

The invention claimed is:

1. A magnetoresistive sensor having a magnetoresistive stack biased by one or more hard bias elements, the sensor characterized by:
the hard bias elements are formed from a hard magnetic material deposited in a thin film having a substantially axial preferred direction of magnetic anisotropy prior to application of a setting field.

2. The magnetoresistive sensor of claim 1 wherein the preferred direction of the magnetic anisotropy of the thin film is in-plane and parallel to an air bearing surface of the magnetoresistive stack.

3. The magnetoresistive sensor of claim 1 wherein the thin film of hard magnetic material has elongated domains oriented parallel to an air bearing surface of the magnetoresistive stack.

4. The magnetoresistive sensor of claim 3 wherein the preferred direction of the magnetic anisotropy of the thin film is in-plane and parallel to an air bearing surface of the magnetoresistive stack.

5. The magnetoresistive sensor of claim 1 wherein the hard magnetic material is oblique deposited at an angle selected from 60° up to 90° measured from a surface normal.

6. The magnetoresistive sensor of claim 5 wherein the oblique deposition is additionally oriented approximately normal to an air bearing surface of the magnetoresistive sensor.

7. The magnetoresistive sensor of claim 6 wherein the oblique deposition is additionally oriented normal to an air bearing surface of the magnetoresistive sensor and the oblique deposition is wobbled about the normal orientation.

8. The magnetoresistive sensor of claim 1 wherein the thin film of hard magnetic material is deposited in a plurality of layers including layers A and B, wherein the layer A is deposited generally perpendicular to the air bearing surface direction followed by deposition of the layer B, the layer B being deposited generally perpendicular to the air bearing surface direction, but 180° from the deposition orientation of the layer A.

9. The magnetoresistive sensor of claim 8 wherein layer A and layer B are deposited at an oblique angle of deposition relative to a surface normal.

10. A hard bias element adjacent to a magnetoresistive stack having a preferred magnetic anisotropy in a magnetoresistive sensor having an air bearing surface, wherein the hard bias element is formed from a hard magnetic thin film material having elongated domains oriented parallel to the preferred magnetic anisotropy.

11. The hard bias element of claim 10 wherein the elongated grains are oblique deposited at an angle selected from 60° up to 90° measured from a surface normal.

12. The hard bias element of claim 10 wherein the elongated grains are oblique deposited at an angle selected from approximately 65° to approximately 75° measured from a surface normal.

13. The hard bias element of claim 10 wherein the hard magnetic thin film material has magnetic anisotropy induced in-plane along an axis parallel to the air bearing surface prior to application of a setting field.

14. The hard bias element of claim 10 wherein the preferred magnetic anisotropy is perpendicular to the air bearing surface.

15. A magnetoresistive sensor comprising:
a magnetoresistive stack having an air bearing surface;
a first hard bias element positioned adjacent to a first side of the magnetoresistive stack and having elongated grains of hard magnetic material oriented parallel to the air bearing surface; and
a second hard bias element positioned adjacent to a second side of the magnetoresistive stack and having elongated grains of hard magnetic material oriented parallel to the air bearing surface.

16. The magnetoresistive sensor of claim 15 wherein the first hard bias element has a preferred direction of magnetic anisotropy in-plane and parallel to the air bearing surface and the second hard bias element has a preferred direction of magnetic anisotropy in-plane and parallel to the air bearing surface.

17. The magnetoresistive sensor of claim 15 wherein the hard magnetic material is oblique deposited at an angle selected from 60° up to 90° measured from a surface normal.

18. The magnetoresistive sensor of claim 17 wherein the oblique deposition is additionally oriented approximately normal to an air bearing surface of the magnetoresistive sensor.

* * * * *